US 8,255,926 B2

(12) United States Patent
Bhogal et al.

(10) Patent No.: US 8,255,926 B2
(45) Date of Patent: Aug. 28, 2012

(54) VIRUS NOTIFICATION BASED ON SOCIAL GROUPS

(75) Inventors: Kulvir S. Bhogal, Forth Worth, TX (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1330 days.

(21) Appl. No.: 11/935,765

(22) Filed: Nov. 6, 2007

(65) Prior Publication Data

US 2009/0119681 A1    May 7, 2009

(51) Int. Cl.
*G06F 13/00* (2006.01)
(52) U.S. Cl. .......................................... 719/318; 726/24
(58) Field of Classification Search .................. 719/318; 726/24
See application file for complete search history.

(56) References Cited

U.S. PATENT DOCUMENTS

| | | | |
|---|---|---|---|
| 7,966,522 B2* | 6/2011 | Fabbrocino | 714/26 |
| 2003/0018903 A1 | 1/2003 | Greca et al. | |
| 2003/0120950 A1 | 6/2003 | Hunt | |
| 2004/0064722 A1* | 4/2004 | Neelay et al. | 713/200 |
| 2006/0075493 A1 | 4/2006 | Karp et al. | |
| 2006/0137012 A1 | 6/2006 | Aaron | |
| 2009/0024992 A1* | 1/2009 | Kulaga et al. | 717/177 |
| 2011/0252269 A1* | 10/2011 | Fabbrocino | 714/2 |

FOREIGN PATENT DOCUMENTS

JP    2004-118692 A    4/2004

OTHER PUBLICATIONS

"Malware", Wikipedia, 12 pages.
"Computer virus", Wikipedia, 16 pages.
"Symantec Announces Comprehensive and Flexible Virus Protection for Lotus Notes/Domino Databases", Symantec Corporation, Jan. 29, 2002, 2 pages.
"Computer Virus Notification System", The University of Scranton, 2 pages.
"Active vulnerability notification", 5 pages.

* cited by examiner

*Primary Examiner* — Andy Ho
(74) *Attorney, Agent, or Firm* — Stephen J. Walder, Jr.; David A. Mims, Jr.

(57) ABSTRACT

Virus notifications based on social groups are provided. When an anti-virus program is updated, the anti-virus program informs its peers within the social group of the update. When a particular peer computing device is infected, it notifies the other anti-virus programs in the social group. The notification to the other anti-virus programs may identify which particular patches/updates are required for that particular peer computing device's anti-virus program based on the data structure that maintains the update status of the anti-virus software on each of the peer computing devices. The anti-virus programs in the social group, based on the notification of the infection from the infected computing device, may automatically perform operations for downloading any required patches and performing a scan of the peer computing device in order to isolate and remove the virus if the peer computing device has become infected.

19 Claims, 5 Drawing Sheets

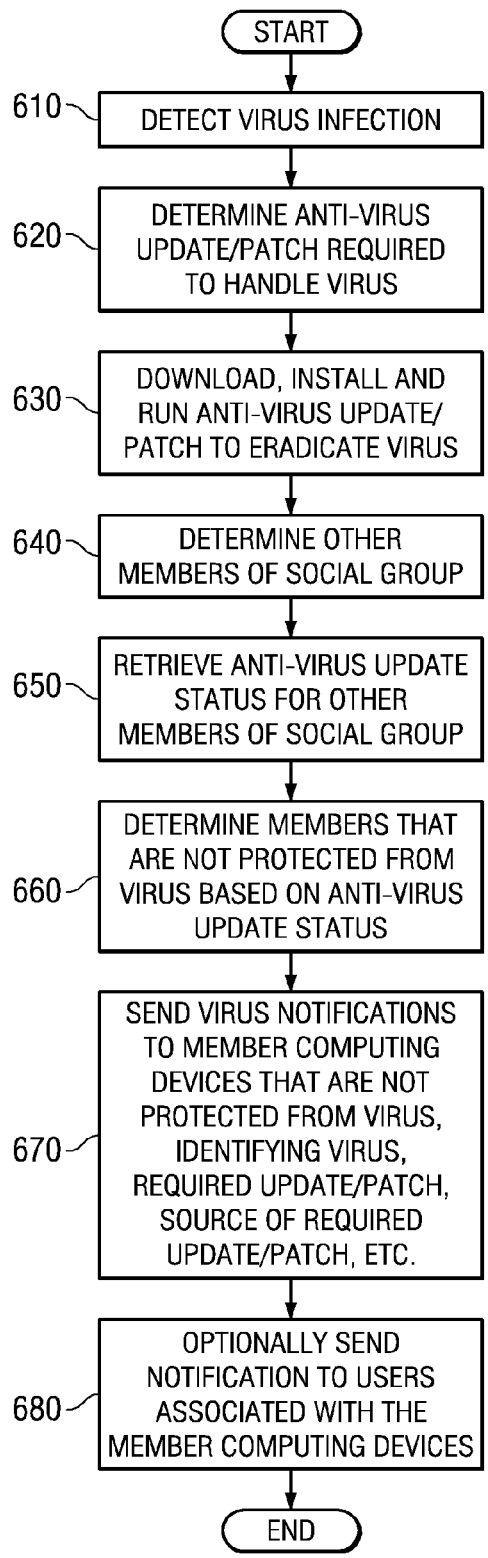
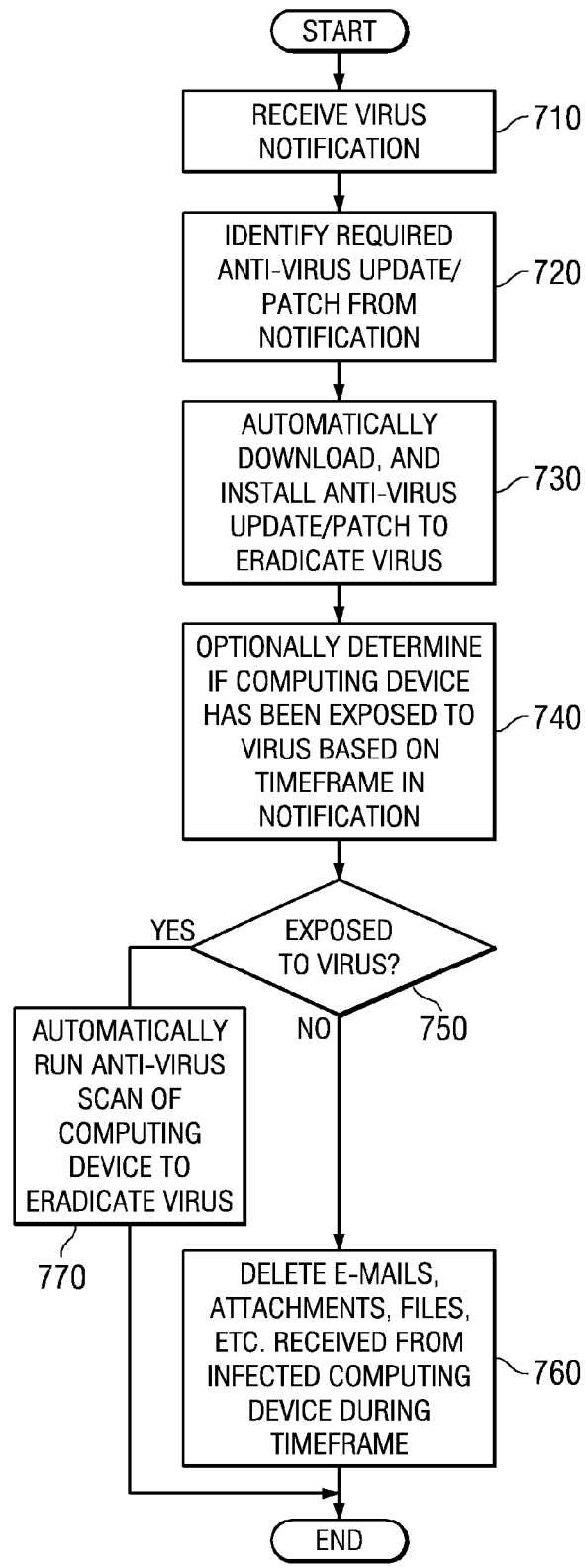
FIG. 6
FIG. 7

VIRUS NOTIFICATION BASED ON SOCIAL GROUPS

BACKGROUND

1. Technical Field

The present application relates generally to an improved data processing system and method. More specifically, the present application is directed to a system and method for virus notification based on social groups.

2. Description of Related Art

A computer virus is a malicious computer program that can either copy itself, or is otherwise transferred to, a computer without permission or knowledge of the user of the computer. In this way, the virus may be run on the computer to thereby infect the computer. Some viruses are programmed to damage the computer by damaging programs, deleting files, reformatting the hard disk, or the like. Other viruses are not designed to do damage but simply replicate themselves and perhaps make their presence known by presenting text, video, or audio messages. Still other viruses may cause problems for the computer by taking up available memory capacity and communication bandwidths. This may cause erratic behavior of the computer and may even cause the computer to crash.

The original virus may modify the copies of itself, or the copies may modify themselves, such as in a metamorphic virus, in order to make the locating and eradication of the virus file instances difficult to achieve. A virus may spread from "computer to computer contact," i.e. through data transfers between computers. For example, a user may retrieve a virus unknowingly by downloading desired files from a website or network location with the virus being attached to the files and/or the website or network location. Recently, viruses have been distributed from one computer to another via attachments to electronic mail messages. Viruses may also be spread by carrying the virus on a removable medium such as a floppy disk, compact disc, or USB drive and using the removable medium in a drive or port of the computing device. Additionally, viruses can spread to other computers by infecting files on a network file system or a file system that is accessed by another computer.

With increased use of networks and the Internet, the spread of viruses has increased. This has led to an increase in the development of mechanisms for combating such viruses, protecting computing systems from viruses, and preventing the spread of such viruses. Virus protection software, such as Norton Anti-virus available from Symantec Corporation, Microsoft One Care available from Microsoft Corporation, and others are often employed on computing devices to both prevent the infection of the computing device by computer virus and to remove such viruses if the computing device happens to become infected. In addition, software firewalls have been developed for preventing outside access to internal network computing devices without permission of users of the internal network computing devices.

A number of such software products provide the ability to send notifications of alerts and advice for patches via electronic mail. For example, Norton Symantec has announced a product that allows administrators to define alerting rules and actions in the event an email virus outbreak occurs. These email notifications may be sent by the Outbreak Notifications feature of Symantec AntiVirus/Filtering 3.0 product (see http://www.symantec.com/press/2002/n020129.html). Similarly, Scranton University has developed a computer virus notification system which is a virus notification system that sends alerts and advice for patches via electronic mail (see http://academic.scranton.edu/department/diresources/dir/cvns.shtml). Furthermore, an active vulnerability notification in which a system scans computers on a network for vulnerabilities and then provides notifications is described at http://www.halfbakery.com/idea/Active_20vulnerability_20notification#1058115600.

SUMMARY

While some mechanisms are provided in the known art for sending notifications of virus alerts and advice for patches via electronic mail, these notifications are general in nature. That is, the notifications are not specific to any social groups. Moreover, the notifications do not provide suggested patches that are specific to individual peer computing devices within a social group based on the specific configuration of protection mechanisms present on the peer computing devices. Furthermore, the notifications do not actually provide the necessary "inoculations" for the virus, i.e. the necessary patch or update required to detect and remove the virus.

The illustrative embodiments provide a system and method for virus notifications based on social groups. In particular, the mechanisms of the illustrative embodiments enhance anti-virus software such that the anti-virus software may provide notifications to specified social groups of a computing device that may have become infected with a virus. With these mechanisms, when an anti-virus program is updated, the anti-virus program informs its peers within the social group of the update to the anti-virus program. In this way, each peer computing device maintains a data structure identifying the update status of the anti-virus software on each of the other peer computing devices.

When a particular peer computing device in the social group is infected with a virus, it not only notifies that computing device's user, but it also notifies the other anti-virus programs in the social group. Moreover, the anti-virus program may further notify other parties at risk in the social group via SMS, Instant Messaging, and the like specifically stating what virus they are at risk for and what patch they need to get for their anti-virus software. The notification to the other anti-virus programs and/or the parties at risk may identify which particular patches/updates are required for that particular peer computing device's anti-virus program based on the data structure that maintains the update status of the anti-virus software on each of the peer computing devices. In some embodiments, notifications may not be sent to anti-virus programs and/or parties that are associated with computing devices which are determined to already have the necessary updates or patches to protect the computing devices from the virus. The anti-virus programs in the social group, based on the notification of the infection from the infected computing device, may automatically perform operations for downloading any required patches and performing a scan of the peer computing device in order to isolate and remove the virus if the peer computing device has become infected.

Alternatively, rather than having the anti-virus program access its provider servers to obtain the patch/update, the notifications themselves may further have the patch/update files attached. In this way, the patch/update itself may be distributed to computing devices associated with other members of the social group on a peer-to-peer basis. Thus, a localized distribution of an "inoculation" for a virus may be made with regard to a relatively small social group that is most at risk for infection rather than the non-specific general distribution of virus notifications typically known in the art.

In one illustrative embodiment, the notification may further provide a timeframe in which the virus is known to have been potentially spread to another peer computing device. For example, upon detection of the virus in an initially infected computing device, the computing device may determine that the last virus scan of the system prior to detecting the infection was on a particular date and time. As a result, the virus would have to have been spread by way of an electronic mail message or the like that was sent after that date and time. Accordingly, the peer computing device, upon receiving the notification with the timeframe indicated, may identify any electronic mail messages received in the peer computing device from the infected computing device after the timeframe. A determination may be made as to whether the electronic mail messages have been read by the user of the peer computing device and if not, they may be automatically deleted/flagged prior to allowing the user to access them. In this way, accessing of the electronic mail message may be prevented and thus, inadvertent exposure to the virus may be prevented. Such operations may be performed in addition to, or in lieu of, automatically downloading the necessary patches/updates and running a scan of the peer computing device to ensure that the peer computing device is not infected.

In one illustrative embodiment, a method for providing notifications of possible computer virus infection to computing devices based on a defined social group is provided. The method may comprise detecting an infection of a first computing device by a computer virus and determining an update or patch to a virus protection software for handling the computer virus. The method may further comprise identifying a social group associated with the first computing device, the social group being a defined group of addresses associated with a plurality of computing devices that communicate with each other and distributing a plurality of notification messages to one or more second computing devices of the plurality of computing devices associated with the social group. The notification messages may identify the computer virus and the determined update or patch to the virus protection software associated with the computer virus.

Identifying the social group associated with the first computing device may comprise retrieving, from a communication application on the first computing device, a listing of addresses that are included in the social group. The listing of addresses may comprise at least one of electronic mail addresses from a contacts directory of an electronic mail client application on the first computing device or instant messaging addresses from an instant messaging application on the first computing device.

The method may further comprise maintaining, in the first computing device, a data structure specifying a current status of virus protection software installed on each other computing device in the plurality of computing devices associated with the social group. Distributing a plurality of notification messages to one or more second computing devices of the plurality of computing devices associated with the social group may comprise generating a separate notification message for each of the one or more second computing devices. A content of the separate notification message may be customized to a current status of virus protection software of a computing device associated with an address to which the separate notification message is sent. The data structure may be updated based on update/patch notifications received from the other computing devices in the plurality of computing devices identifying an update/patch to the other computing devices' virus protection software.

Distributing a plurality of notification messages to one or more second computing devices of the plurality of computing devices associated with the social group may comprise determining, based on the data structure, which computing devices in the plurality of computing devices do not have the update or patch for handling the computer virus and sending a notification message to only those computing devices of the plurality of computing devices determined to not have the update or patch for handling the computer virus installed in their virus protection software. Moreover, a message may be sent to computing devices of the plurality of computing devices determined to already have the update or patch for handling the computer virus installed in their virus protection software. The message may indicate potential exposure to the computer virus and that the update or patch has already been installed on an associated computing device.

The method may further comprise obtaining, in at least one of the one or more second computing devices, the update or patch for handling the computer virus, installing the update or patch in virus protection software of the at least one of the one or more second computing devices, and running the virus protection software of the at least one of the one or more second computing devices. The update or patch for handling the computer virus may be received, from the first computing device, in the at least one of the one or more second computing devices in association with the notification message. The notification message may include an indication of a timeframe in which the computer virus was spread to other computing devices in the plurality of computing devices. Running the virus protection software may comprise running the virus protection software on communications or data received by the at least one of the one or more second computing devices in the indicated timeframe.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 is a flowchart outlining an exemplary operation of an infected computing device in accordance with one illustrative embodiment; and FIG. 7 is a flowchart outlining an exemplary operation of a peer computing device in response to receiving a virus notification from an infected computing device in accordance with one illustrative embodiment.

DETAILED DESCRIPTION OF THE ILLUSTRATIVE EMBODIMENTS

Figure 1:
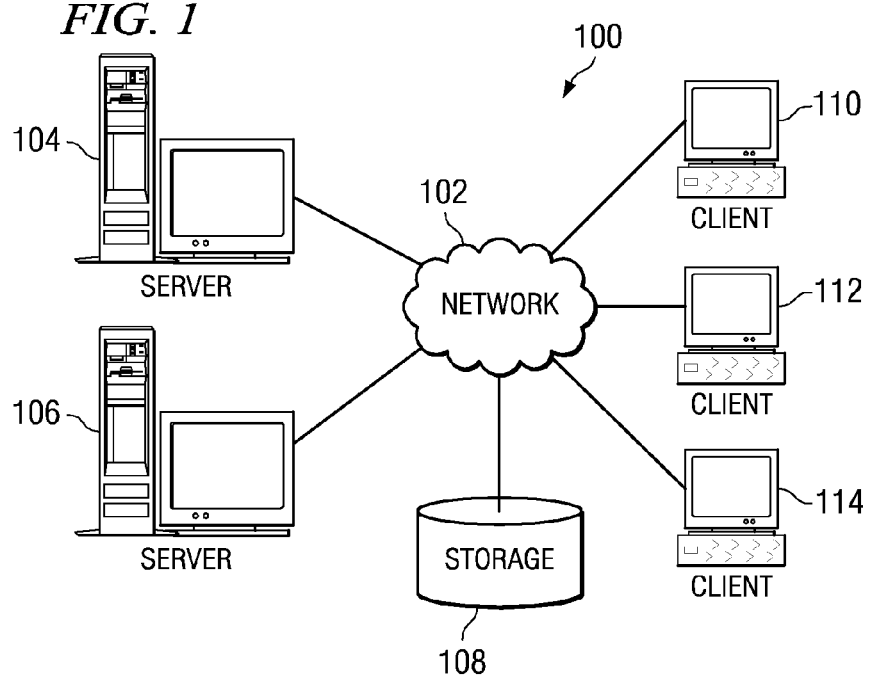
FIG. 1 is an exemplary representation of an exemplary distributed data processing system in which aspects of the illustrative embodiments may be implemented.
Figure 2:
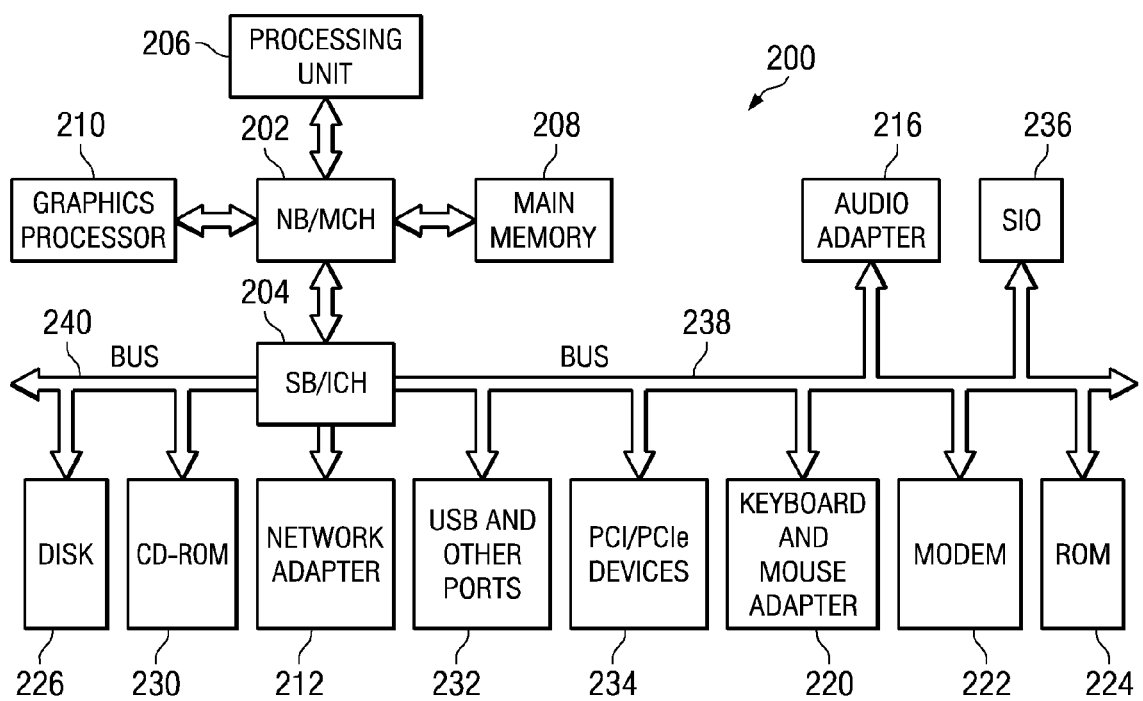
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a system and method for virus notifications based on social groups. In particular, the mechanisms of the illustrative embodiments enhance anti-virus software such that the anti-virus software may provide notifications to specified social groups of a computing device that may have become infected with a virus and provide information regarding updates/patches that a specific peer computing device in a social group needs in order to protect itself from the virus.

For example, with reference again to FIG. 1, the client computing devices 110-114 each have anti-virus software running on these client computing devices 110-114 for protecting the client computing devices 110-114 from the spread of computer viruses via the at least one network 102 and through other means. Moreover, with the mechanisms of the illustrative embodiments, the anti-virus software may provide a functionality for defining social groups associated with the client computing devices 110-114. For example, the social groups may be defined by specifying a set of network addresses, electronic mail addresses, or the like, associated with each of the other client computing devices 110-114, or users of the client computing devices 110-114, that are part of the same social group.

In one illustrative embodiment, the anti-virus software may interface with an electronic mail client application, an instant messaging application, or any other communication application to obtain a listing of addresses that should be included in a social group definition. For example, a social group may be defined by adding all, or a portion of, an electronic mail addresses and/or instant messaging addresses from a user's "contacts" data structure of an electronic mail client application and/or instant messaging application, to a social group data structure associated with the anti-virus software. It may be beneficial to add all addresses from these sources to the social group since many viruses will spread automatically without the knowledge of the user by sending electronic mail messages or instant messages to all of the addresses in a user's contacts listing indiscriminately. However, a user may have addresses in a contacts data structure that the user does not wish to communicate with in this regard, e.g., business contacts, or the like, and thus, the communication application (electronic mail or instant messaging) may provide an option for defining a virus notification social group in which addresses are stored for client computing devices 110-114 and/or user addresses to which virus notifications are to be sent in the event of an infection.

Alternatively, rather than obtaining the social group definition from the communication application, a functionality may be provided within the anti-virus software itself to allow a user to define the social group directly by inputting the addresses associated with the social group. In this instance, however, the anti-virus software may still interface with the communication application(s), through the mechanisms of the illustrative embodiments, to send and receive notifications of viruses, as described in greater detail hereafter.

The social group may be established individually on each client computing device 110-114. Alternatively, a central server, such as server 104, may store the social group data structure for all of the client computing devices 110-114 in the social group. Thus, each client computing device 110-114 may upload its definition of the virus notification social group to the central server 104 with the social group data structure maintained on the server 104 being the aggregation of the addresses specified in each of the individual client computing device 110-114 social group definitions. The social group data structure on the server 104 may then be used to distribute an update to each of the client computing devices 110-114 to thereby update their local social group data structures such that each client computing device 110-114 uses the same set of addresses in their local social group data structures.

Having established a social group, a discovery operation may be performed by sending a request to the anti-virus software on each of the client computing devices 110-114 to determine the current version of the anti-virus software and/or the update/patch status of the anti-virus software. An update/patch status provides an indication of what the current status of the anti-virus software's virus definitions are so that it can be determined which virus definition updates/patches the anti-virus software has and still needs. Such an indication may be a specific identification of the last update/patch file downloaded by the anti-virus software. Alternatively, the identification may simply be a timestamp indicating the last time that the anti-virus software was updated/patched. This timestamp may be compared against a central server that is responsible for distributing anti-virus software updates/patches to determine which updates/patches have been published after the time indicated by the timestamp. In this way, anti-virus software may be able to determine which virus definitions each anti-virus program on each of the client computing devices 110-114 has and does not have and thus, to which viruses a client computing device 110-114 may be potentially exposed.

The request for update/patch status may be sent by each client computing device 110-114 to each other client computing device 110-114 in the social group. Alternatively, the server 104 may be responsible for sending the requests to each of the client computing devices 110-114, collecting the responses into a social group update/patch status data structure, and then distributing the social group update/patch status data structure to each of the client computing devices 110-114 in the social group. In this way, each of the client computing devices 110-114 may be provided with the current update/patch status of each of the other client computing devices 110-114 in the social group.

With these mechanisms, when an anti-virus program in a client computing device 110-114 is updated, the anti-virus program informs its peers within the social group of the update to the anti-virus program. Thus, a client computing device 110 may download the most recent virus definitions from a server, e.g., server 106, responsible for distributing updates/patches to anti-virus software on client computing devices. The client computing device 110 may then, itself, identify the other addresses associated with other client computing devices 112-114 in the social group and send them a notification of the update/patch to the anti-virus software on client computing device 110. The anti-virus software on the other client computing devices 112-114 may receive the notification and update their social group update/patch status data structures to reflect the new update to the anti-virus software on the client computing device 110.

Alternatively, rather than the anti-virus software on the client computing device 110 determining the addresses of the other client computing devices 112-114 in the social group, the anti-virus software on the client computing device 110 may send a notification to the server 104. The server 104 may then determine the addresses of other client computing devices 112-114 in the social group based on its stored social group data structure and update its own stored social group update/patch status data structure for the social group. This updated social group update/patch status data structure may then be communicated to the client devices 112-114. In this way, each peer computing device 110-114 may maintain a data structure identifying the update status of the anti-virus software on each of the other peer computing devices 110-114.

When a particular client computing device 110-114 in the social group is infected with a virus, it not only notifies that computing device's user, but it also notifies the other anti-virus programs on the other client computing devices 110-114 in the social group. Such notifications may be made using known application-to-application communication mechanisms such that one anti-virus program/software on one client computing device 110-114 may communicate directly with other anti-virus programs/software on other client computing devices 110-114. Alternatively, the notification may be sent from the infected client computing device, e.g., client computing device 110, to the server 104 which may then perform the functions of determining the addresses of other client computing devices 112-114 in the social group and sending the notifications to these client computing devices 112-114. The notification preferably includes an identification of the virus that has infected the client computing device 110 and an update/patch that is required to block or eradicate the virus from the client computing devices 110-114.

The determination of the particular update/patch required to block or eradicate the virus may be made by communicating with the server 106 responsible for distributing updates/patches, informing the server of which virus the client computing device 110 is infected with, and obtaining an indication from the server 106 of which update/patch is required to eliminate the virus or otherwise handle the virus so that it does not negatively impact the operation of the client computing device 110. This identifier of the update/patch files that are required to address the virus may be included in the notification to the anti-virus programs/software of the other client computing devices 112-114 in the social group. Moreover, information regarding a source from which such update/patch files may be obtained may further be provided in the notification.

In addition to the notification to the anti-virus programs/software on the client computing devices 112-114, the anti-virus program of the infected client computing device 110, or the server 104, may further notify other parties at risk in the social group via SMS, Instant Messaging, and the like, specifically stating what virus they are at risk for and what patch they need to get for their anti-virus software. That is, the notification to the anti-virus programs/software does not necessarily result in the user being aware of the virus having been potentially spread. Thus, in addition to the notifications to the anti-virus programs/software, the anti-virus program/software of the infected client computing device 100 may send a human readable notification to an electronic mail address, instant message address, SMS address, or the like, to inform the user of the virus, the update/patch required to handle the virus, and the fact that the user's anti-virus software has been informed of the potential infection and is automatically taking action to immunize the user's client computing device 112-114 against the virus. In this way, notifications of risk of infection and what "inoculations" for a virus need to be installed may be distributed through multiple communication channels.

The notifications may be tailored/customized to the specific client computing devices 112-114 based on their current update/patch status as identified in the social group update/patch status data structure. That is, the required update/patch may be compared against the current update/patch status for the other client computing devices 112-114 in the social group to identify which client computing devices 112-114 are potentially in a state where they may be infected by the virus if the virus has been spread from the infected client computing device 110. Thus, in one illustrative embodiment, notifications may be sent only to those client computing devices 112-114 that are determined to be potentially infected by the virus. Other client computing devices in the social group that have the required update/patch may not receive notifications since they are already immunized against the virus. Alternatively, a notification may still be sent to these client computing devices and the associated user to inform them of the potential exposure to the virus but indicating that the required update/patch has already been installed on the client computing device. Still further, depending upon the particular update/patch status of the individual anti-virus programs/software on the client computing devices 112-114, the notifications sent may be different, e.g., a client computing device 112 has an old patch or update that is no longer effective and another client computing device 114 does not have any patch or update to address the particular virus.

The anti-virus programs in the social group, based on the notification of the infection from the infected computing device, may automatically perform operations for downloading any required patches and performing a scan of the peer computing device in order to isolate and remove the virus if the peer computing device has become infected. That is, the anti-virus program/software on the client computing device 112, in response to receiving a notification from either the server 104 or the other infected client computing device 110, may automatically download the update/patch indicated in the notification from the source identified in the notification, or other source associated with the anti-virus program/software, and install that update/patch on the client computing device 112. The anti-virus program/software may then automatically initiate a scan of the client computing device 112 to locate, isolate, and eradicate the virus if it indeed has been spread to the client computing device 112. The operations for updating/patching an anti-virus program/software and performing scans, isolating files infected with the virus, and eradicating the virus are generally known in the art and thus, a more detailed explanation is not provided herein. While these operations are generally known in the art, they have not been previously initiated automatically based on notifications sent to members of a social group in response to a detected infection in one of the client computing devices within the social group.

Alternatively, rather than having the anti-virus program access its provider servers to download the patch/update, the notifications themselves may further have the patch/update files attached. In this way, the patch/update itself may be distributed to computing devices associated with other members of the social group on a peer-to-peer basis. Thus, a localized distribution of an "inoculation" for a virus may be made with regard to a relatively small social group that is most at risk for infection rather than the non-specific general distribution of virus notifications typically known in the art.

It should be noted that performing a scan of a client computing device is a time consuming process and may dominate resources of the client computing device causing the client computing device to perform other operations slowly or not at all until the scan is completed. Thus, it would be advantageous to first determine if the client computing device has indeed been exposed to the virus before performing the scan of the client computing device. In order to aid in this determination, in one illustrative embodiment, the notification that is sent from the infected client computing device 110 may further provide a timeframe in which the virus is known to have been potentially spread to another client computing device 112-114 in the social group. For example, upon detection of the virus in the initially infected client computing device 110, the client computing device may determine that the last virus scan of the system prior to detecting the infection was on a particular date and time. As a result, the virus would have to have been spread by way of an electronic mail message or the like that was sent after that date and time.

Accordingly, another client computing device 112 in the social group, upon receiving the notification with the timeframe indicated, may identify any electronic mail messages or other data transmissions received in the client computing device 112 from the infected computing device 110 after the timeframe. A determination may be made as to whether the electronic mail messages, attachments, or files transferred in a data transmission have been read or otherwise accessed by the user of the client computing device 112 or the client computing device 112 itself. If the electronic mail messages, attachments, or files have not been accessed, they may be automatically deleted prior to allowing the user or client computing device 112 to access them. In this way, accessing of the electronic mail message, attachments, files, etc., may be prevented and thus, inadvertent exposure to the virus may be prevented.

Such operations may be performed in addition to, or in lieu of, automatically downloading the necessary patches/updates and running a scan of the peer computing device to ensure that the peer computing device is not infected. In one illustrative embodiment, the update/patch that is required to handle the identified virus may always be downloaded and installed on the client computing devices 110-114 regardless of whether or not the client computing device 110-114 has actually been exposed to the virus or not. The scanning may be performed, in this illustrative embodiment, only if it is determined that the electronic mail message, attachment, files, or the like, that may include the virus have actually been accessed by the client computing device 110-114. Otherwise, if the electronic mail message, attachment, files, or the like, have not been accessed, the scanning of the client computing device 110-114 may be deferred until a time at which the client computing device 110-114 is relatively idle or a next scheduled time for performing such a scan.

It should be appreciated, as described above, that the mechanisms of the illustrative embodiments may be implemented in a distributed or centralized manner. For example, in a distributed embodiment, each individual client computing device 110-114 is responsible for maintaining their own local version of the social group definition data structure and social group update/patch status data structure. Each individual client computing device further comprises a social group virus notification system that works in conjunction with the anti-virus software and communication applications on the client computing device to send notifications of updates/patches to other computing devices in the social group, identify virus infections, identify other client computing devices in the social group to which the virus may have been spread, identify which client computing devices are not protected from the virus based on their current update/patch status, and send notifications to the client computing devices that are not protected from the virus so that they may automatically download, install, and run the required anti-virus update to eradicate the virus from their system.

Alternatively, the social group virus notification system may be centralized, such as on a server 104. In such an embodiment, the server 104 may maintain the social group definition data structure and status/update data structure and may use these data structures to perform the various operations described above with regard to the social group virus notification system of the distributed embodiment. In this embodiment, the client computing devices need only utilize their anti-virus software to download appropriate updates/patches, install them, and run them to eradicate viruses in response to notifications. The anti-virus software may also need to be able to send notifications to the server 104 of updates/patches that they have installed and notifications of infection by a virus. The server 104 may interface with the anti-virus software server 106 to initiate downloads to the client computing devices 110-114 and send notifications to the client computing devices 110-114 in the social group of the potential infection. Other embodiments may make use of a different division of responsibilities between the client computing devices 110-114 and the server 104 and are intended to be within the spirit and scope of the present invention.

Figure 3:
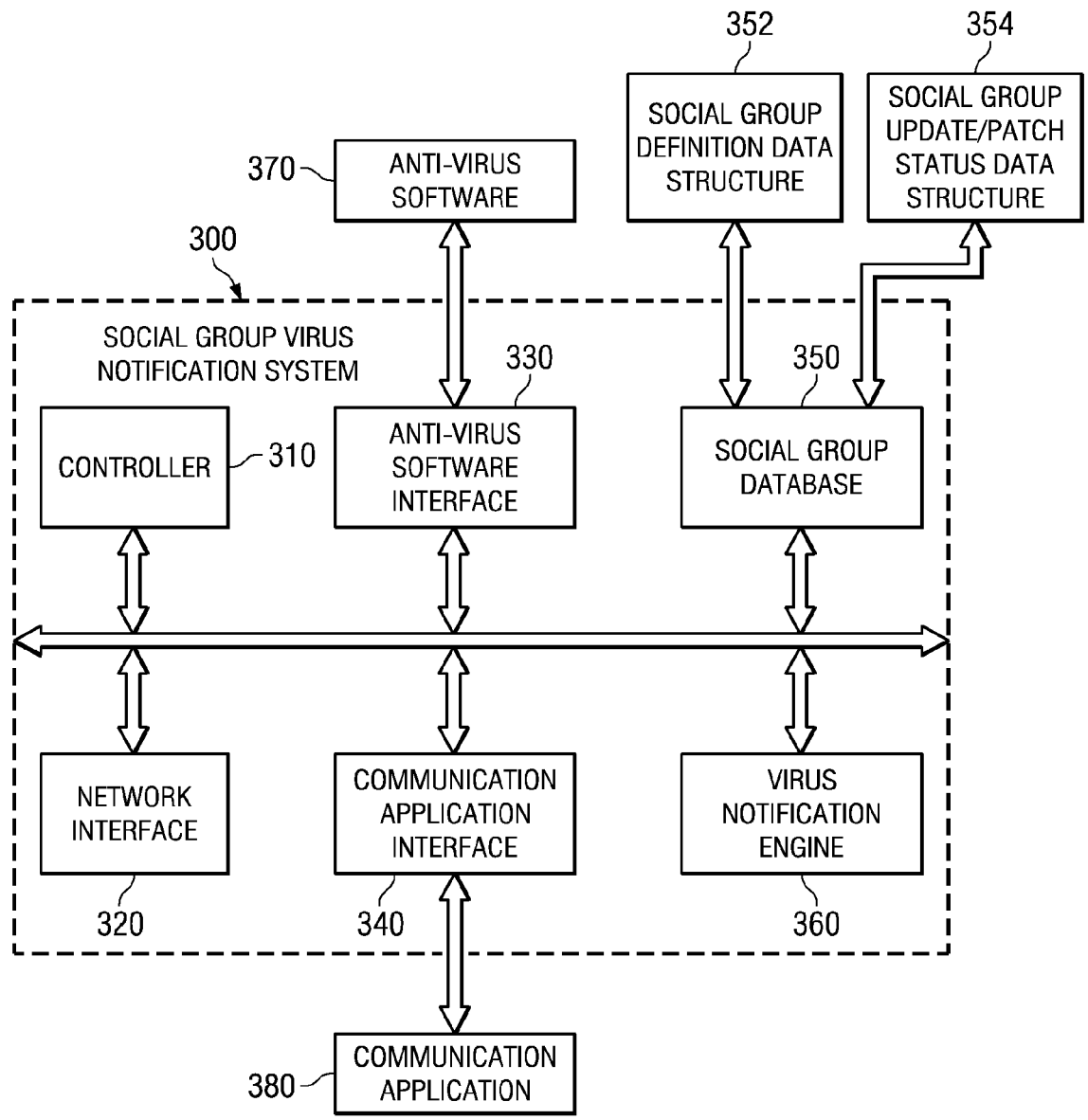
FIG. 3 is an exemplary block diagram of the primary operational components of a social group virus notification system in accordance with one illustrative embodiment.

FIG. 3 is an exemplary block diagram of the primary operational components of a social group virus notification system in accordance with one illustrative embodiment. As shown in FIG. 3, the social group virus notification system 300 comprises a controller 310, a network interface 320, an anti-virus software interface 330, a communication application interface 340, a social group database 350, and a virus notification engine 360. The elements 310-360 of the social group virus notification system 300 may be implemented as software, hardware, or any combination of software and hardware. In one illustrative embodiment, the elements 310-360 are implemented as software instructions executed by one or more processors of one or more data processing devices.

The embodiment of the social group virus notification system 300 in FIG. 3 assumes a distributed implementation of the mechanisms of the illustrative embodiments. It should be appreciated that in a centralized implementation, the anti-virus software interface 330 may not be necessary since the centralized server would communicate with the anti-virus software on the client computing devices via the network interface 320.

The controller 310 controls the overall operation of the social group virus notification system 300 and orchestrates the operation of the other elements 320-360. The network interface 320 provides a communication interface through which notifications may be sent and received. Moreover, anti-virus updates/patches may be requested and received via this network interface 320.

The anti-virus software interface 330 provides a communication interface between the social group virus notification system 300 and anti-virus software 370. Through the anti-virus software interface 330, the social group virus notification system 300 may receive indications of virus infections of the computing device upon which the social group virus notification system 300 is running, send commands to download virus updates/patches to the anti-virus software 370, receive information regarding the current update/patch status of the anti-virus software 370, and the like.

The communication application interface 340 provides a communication interface between the social group virus notification system 300 and a communication application 380 of the computing device. The communication application 380 may be an electronic mail application, an instant messaging application, or any other data based communication application. The social group virus notification system 300 may send and receive notifications of virus updates/patches, virus infections, and the like, via the communication application interface 340, the communication application 380, and the network interface 320.

The social group database 350 stores the social group definition data structure 352 and social group update/patch status data structure 354. These data structures 352 and 354 are used to determine the addresses of other members of a defined social group in order to send notifications to the computing devices of these other members of the social group and to track and identify the current update/patch status of the anti-virus software on each of the computing devices of the other members of the social group. The virus notification engine 360 comprises the logic for performing the various decisions and operations for sending notifications to other members of the social group based on the current update/patch status of these other member's anti-virus software as determined from the social group database 350.

In operation, in response to a notification from the anti-virus software 370 that a new update/patch has been downloaded and installed, the controller 310 instructs the virus notification engine 360 to send notifications to the other members of the social group indicating the new update/patch status of the anti-virus software 370. The virus notification engine 360 accesses the social group definition data structure 352 of the social group database 350 to identify the other members of the social group and their addresses, e.g., network address, electronic mail address, SMS address, instant messaging address, and/or the like. The virus notification engine 360 then provides this information along with the content of the notification to the communication application 380 via the communication application interface 340. The communication application 380 then composes the various communications for sending the notifications to the addresses associated with the members of the social group. These communications are then transmitted to the designated recipients via the network interface 320. In this way, each of the social group virus notification systems on each of the computing devices associated with members of the social group are informed of the new update/patch status.

In response to a notification from the anti-virus software 370 via the anti-virus software interface 330 that the computing system, on which the social group virus notification system 300 is running, has been infected with a virus, the controller 310 instructs the anti-virus software 370 to download and install the required update/patch for handling the virus if it has not already done so. The anti-virus software 370, or the controller 310, may send a request, via the network interface 320, to the anti-virus software provider's server for information regarding the required update/patch to handle the specified virus.

The controller 310 may further instruct the virus notification engine 360 to send notifications to other members of the social group informing them of the infection, their potential exposure to the virus, the identity of the virus, the update/patch required to handle the virus, and the like. The virus notification engine 360 may then retrieve the addresses of the other members of the social group from the social group definition data structure 352 of the social group database 350. The virus notification engine 360 may further retrieve the current update/patch status of the other members of the social group from the social group update/patch status data structure 354. Based on the current update/patch status of the other members of the social group, the virus notification engine 360 may determine which other members of the social group may be potentially infected with the virus because they do not have the correct update/patch for handling the virus. Based on this determination, the virus notification engine 360 may determine which of the members of the social group to which notifications need to be sent and what the content of those notifications should be. This may be done on a member by member basis such that individually tailored notifications are sent to each member based on their current update/patch status. Alternatively, notifications may be sent in general to all members of the social group with a general notification of the virus infection and the required update/patch without tailoring the notification to the current update/patch status of each member of the social group. The notifications may be composed by the virus notification engine 360 and sent to the communication application 380 via the communication application interface.

In response to receiving a notification of an update/patch being installed by another member of the social group, the notification being received via the network interface 320, the controller 310 may update one or more entries in the social group database 350, such as in social group update/patch status data structure 354, to reflect the update/patch by the other member. In this way, the social group virus notification system 300 maintains an up-to-date status of each member of the social group with regard to the current updates/patches to their anti-virus software for purposes of sending virus infection notifications if necessary.

In response to receiving a notification of a possible virus infection from another member of the social group, the controller 310 instructs the anti-virus application 370 via the anti-virus application interface 330 to download and install the required update/patch for handling the virus if it has not already done so. The required update/patch may be identified from information received in the notification from the other member of the social group. The controller 310 may then automatically instruct the anti-virus software 370 to run a scan of the computing device to identify infected files and eradicate them from the computing device. Thus, in this way, the computing device may be informed of potential virus infections from other members of a social group and may automatically download updates/patches, install them, and run a scan of the computing device.

Alternatively, as discussed previously, the particular patch/update that is required for locating and eradicating the virus from the computing devices of the other members of the social group may be attached to the notifications. In such a case, it would not be necessary to download the patch/update from a server but instead simply install the patch/update attached to the notification. The particular patch/update may be obtained from the originally infected computing device which, prior to sending the notifications to the other computing devices of the social group, may download and install the patch/update from a server in order to avoid spreading the virus further. The downloaded patch/update may then be attached to the notifications sent by the originally infected computing device. Of course, it may be desirable to perform a validation or verification of the notifications prior to installing any attached patches/updates in order to avoid any spoofing of addresses of computing devices within the social group. Such verification or validation is generally known in the art and thus, a more detailed description is not provided herein.

Figure 4:
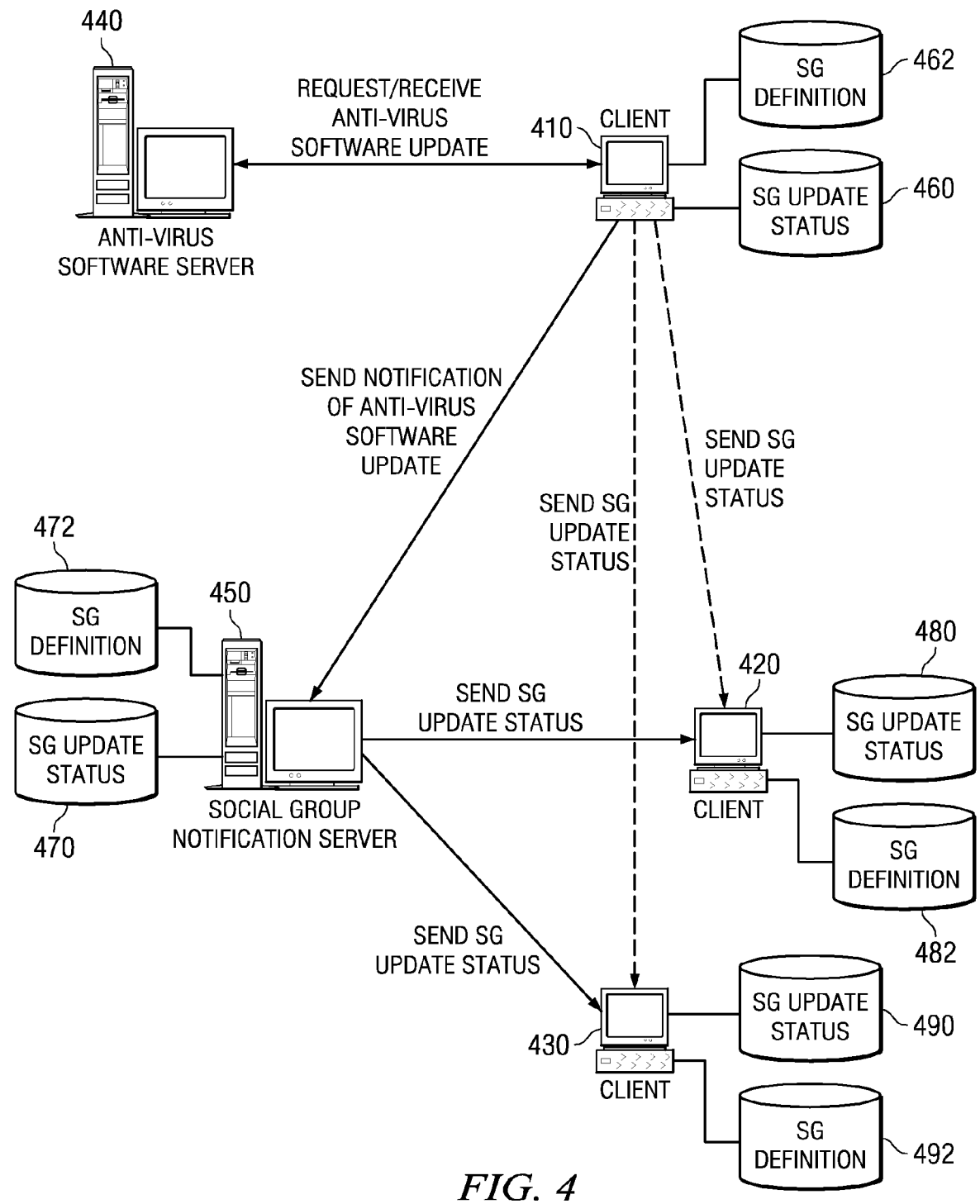
FIG. 4 is an exemplary diagram illustrating a distribution of a notification of anti-virus update/patch information in accordance with one illustrative embodiment.

FIG. 4 is an exemplary diagram illustrating a distribution of a notification of anti-virus update/patch information in accordance with one illustrative embodiment. As shown in FIG. 4, anti-virus software on a client computing device 410 may download and install an update/patch for the anti-virus software by sending a request to an anti-virus software provider server 440 and receiving, in response, the requested update/patch. In response to this update/patch being installed, the client computing device 410 may send notifications of the update/patch to the other client computing devices 420 and 430 in its defined social group. These notifications may be sent directly to these other client computing devices 420-430 (as indicated by the dotted lines) or indirectly through a social group notification server 450. In some embodiments, such as an embodiment with direct notifications to the other client computing devices 420-430, the client computing device 410 may identify which client computing devices 420-430 to send the notifications to using the social group definition data structure 462. In other illustrative embodiments, the determination of which client computing devices 420-430 to send notifications of the update/patch may be done by the social group notification server 450 using its own copy of the social group definition data structure 472 (represented in FIG. 4 with solid lines).

Figure 5:
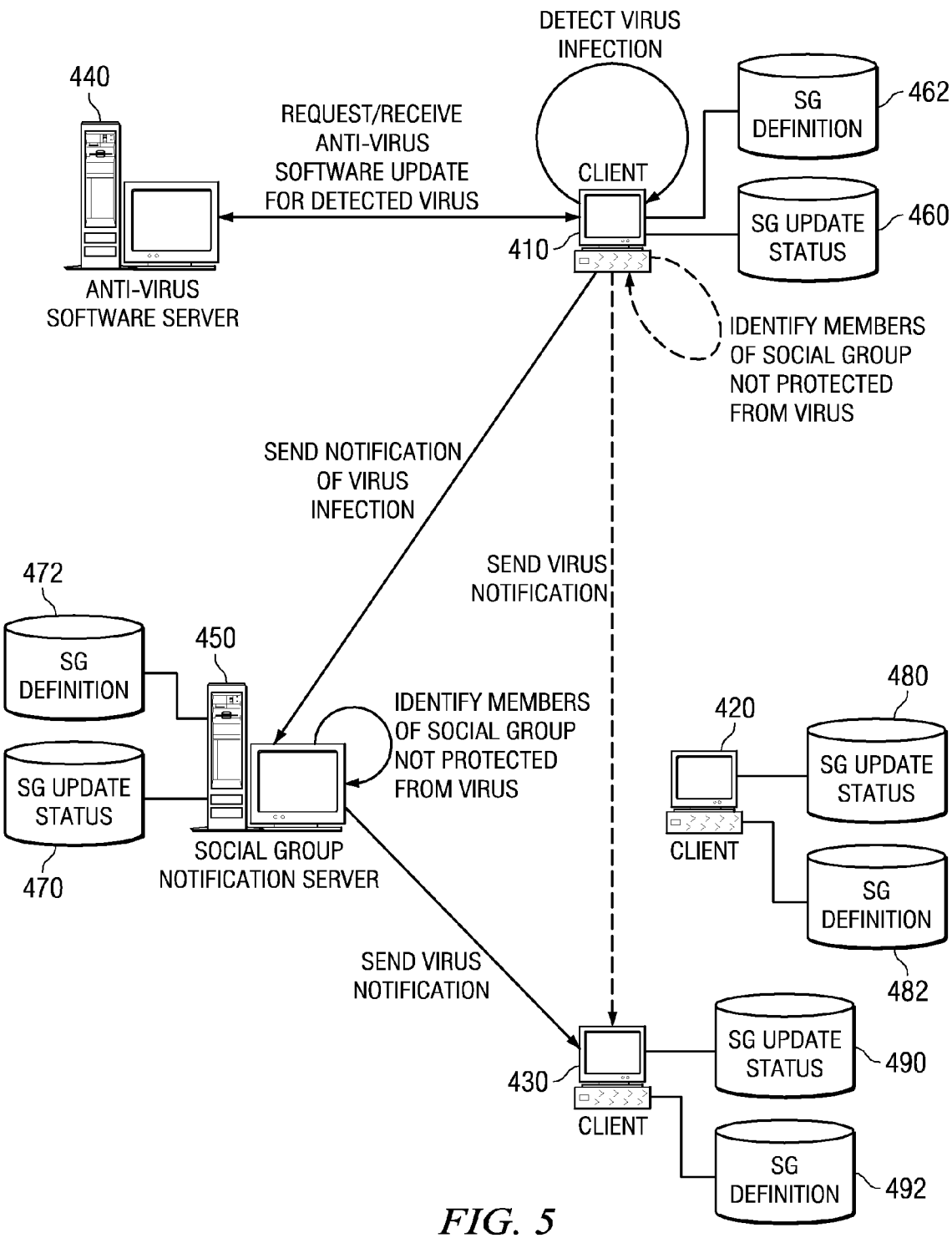
FIG. 5 is an exemplary diagram illustrating one example of a distribution of notifications between peer computing devices of a social group in accordance with one illustrative embodiment.

FIG. 5 is an exemplary diagram illustrating one example of a distribution of notifications between peer computing devices of a social group in accordance with one illustrative embodiment. As shown in FIG. 5, when the client computing device 410 detects a virus infection, the client computing device 410 may request the required update/patch for handling the virus from the anti-virus software provider server 440, if it has not already installed the required update/patch. The server 440 may provide the requested update/patch which is then installed on the client computing device 410 and a scan of the computing device 410 is performed to eradicate the virus.

In addition, the client computing device 410 may send a notification of the virus infection to the other client computing devices 420-430 in the same social group as the client computing device 410. These notifications may be sent directly (shown by dotted lines) or indirectly through the notification server 450 (shown by solid lines) in a similar manner as described above with regard to FIG. 4. In an embodiment in which the notifications are indirectly sent through the server 450, the client computing device 410 may send a notification of the virus infection to the server 450 which may then use its own local copies of the social group data structures 470 and 472 to determine the other members of the social group and their current update/patch status. In this way, the server 450 may determine which client computing devices do not have the required update/patch for handling the virus and thus, may have become infected by the client computing device 410. In the depicted example, only client computing device 430 is determined to not have the required update/patch and thus, a notification is only sent to client computing device 430. Client computing device 420 already has the required update/patch and thus, is not at risk to becoming infected with the virus.

As mentioned above, the notification that is sent to the client computing device 430 may be tailored to the current update/patch status of the anti-virus software running on the client computing device 430. Alternatively, a general notification may be sent to all of the client computing devices 420-430 in the same social group as the client computing device 410. In an embodiment in which there is direct notifications from client computing devices 410-430 in the same social group, the functions attributed to the server 450 above may be performed in the infected client computing device 410.

FIGS. 6-7 are flowcharts that illustrate operations of a client computing device of a defined social group in accordance with one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 6 is a flowchart outlining an exemplary operation of an infected computing device in accordance with one illustrative embodiment. As shown in FIG. 6, the operation starts with a virus infection being detected (step 610), such as by using anti-virus software. A required update/patch for handling the detected virus is determined (step 620), such as by communicating with an anti-virus software provider server. The required update/patch is downloaded, installed, and run to eradicate the virus on the infected computing device (step 630).

The other members of the social group are then determined (step 640) such as based on a social group definition data structure. The anti-virus update/patch status information for these other members of the social group is determined (step 650) and the members of the social group that are not protected from the virus are determined (step 660). Virus notifications are sent to the member computing devices that are not protected from the virus (step 670). The notifications may identify the virus, the required update/patch, the source of the required update/patch, and the like. A notification may then be optionally sent to the users associated with the member computing devices informing them of the virus infection and that measures are being taken to protect their client computing devices (step 680). The operation then terminates.

FIG. 7 is a flowchart outlining an exemplary operation of a peer computing device in response to receiving a virus notification from an infected computing device in accordance with one illustrative embodiment. As shown in FIG. 7, the operation starts with a virus notification being received (step 710). The required anti-virus update/patch is identified from the notification (step 720). The required update/patch is then downloaded and installed (step 730). Alternatively, the update/patch may be included with the virus notification and thus, it is not necessary to download the update/patch but instead perform a validation of the virus notification and install the attached update/patch. Optionally, a determination may be made as to whether the computing device has been exposed to the virus based on a timeframe that may have been included in the notification (step 740). As mentioned above, the notification may indicate a time at which a last scan of the infected computing system was performed, or when a last update of the anti-virus software of the infected client computing device was performed prior to the infection. This information may be used to identify electronic mail messages, attachments, files, etc. that may have the virus.

If the computing device has been exposed to the virus (step 750), then the anti-virus scan of the computing device may be automatically performed to eradicate the virus (step 770). Otherwise, if the computing device has not been exposed, then the emails, attachments, files, etc., that were created or modified during the designated time frame may be deleted (step 760). The operation then terminates.

Thus, the illustrative embodiments provide a mechanism for automatically sending virus notifications to members of a social group. In this way, the parties that are most likely infected with a virus from a client computing device may be quickly identified and notification sent to them so that corrective measures may be taken. Mechanisms are provided for automatically determining the status of the anti-virus software on each of these member's computing devices and determining the content of the notification based on the status. Thus, notifications may be tailored to the status of the computing devices such that the notifications may provide the most accurate information for required corrective action.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable medium, storage medium, or computer-recordable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device). Examples of a computer-recordable medium, a storage medium, or a computer-usable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for providing notifications of possible computer virus infection to computing devices based on a defined social group, comprising:

detecting an infection of a first computing device by a computer virus;

determining an update or patch to a virus protection software for handling the computer virus;

identifying a social group associated with the first computing device, the social group being a defined group of addresses associated with a plurality of computing devices that communicate with each other;

distributing a plurality of notification messages to one or more second computing devices of the plurality of computing devices associated with the social group, wherein the notification messages identify the computer virus and the determined update or patch to the virus protection software associated with the computer virus;

maintaining, in the first computing device, a data structure specifying a current status of virus protection software installed on each other computing device in the plurality of computing devices associated with the social group; and generating a separate notification message for each of the one or more second computing devices, wherein a content of the separate notification message is customized to a current status of virus protection software of a computing device associated with an address to which the separate notification message is sent.

2. The method of claim 1, wherein identifying the social group associated with the first computing device comprises:

retrieving, from a communication application on the first computing device, a listing of addresses that are included in the social group.

3. The method of claim 2, wherein the listing of addresses comprises at least one of electronic mail addresses from a contacts directory of an electronic mail client application on the first computing device or instant messaging addresses from an instant messaging application on the first computing device.

4. The method of claim 1, wherein the data structure is updated based on update/patch notifications received from the other computing devices in the plurality of computing devices identifying an update/patch to the other computing devices' virus protection software.

5. The method of claim 1, wherein distributing a plurality of notification messages to one or more second computing devices of the plurality of computing devices associated with the social group comprises:
 determining, based on the data structure, which computing devices in the plurality of computing devices do not have the update or patch for handling the computer virus; and
 sending a notification message to only those computing devices of the plurality of computing devices determined to not have the update or patch for handling the computer virus installed in their virus protection software.

6. The method of claim 5, further comprising:
 sending a message to computing devices of the plurality of computing devices determined to already have the update or patch for handling the computer virus installed in their virus protection software, the message indicating potential exposure to the computer virus and indicating that the update or patch has already been installed on an associated computing device.

7. The method of claim 1, further comprising:
 obtaining, in at least one of the one or more second computing devices, the update or patch for handling the computer virus;
 installing the update or patch in virus protection software of the at least one of the one or more second computing devices; and
 running the virus protection software of the at least one of the one or more second computing devices.

8. The method of claim 7, wherein the update or patch for handling the computer virus is received, from the first computing device, in the at least one of the one or more second computing devices in association with the notification message.

9. The method of claim 7, wherein the notification message includes an indication of a timeframe in which the computer virus was spread to other computing devices in the plurality of computing devices, and wherein running the virus protection software comprises running the virus protection software on communications or data received by the at least one of the one or more second computing devices in the indicated timeframe.

10. A computer program product comprising a storage medium having a computer readable program, wherein the computer readable program, when executed on a computing device, causes the computing device to:
 detect an infection of a first computing device by a computer virus;
 determine an update or patch to a virus protection software for handling the computer virus;
 identify a social group associated with the first computing device, the social group being a defined group of addresses associated with a plurality of computing devices that communicate with each other;
 distribute a plurality of notification messages to one or more second computing devices of the plurality of computing devices associated with the social group, wherein the notification messages identify the computer virus and the determined update or patch to the virus protection software associated with the computer virus;
 maintain in the first computing device, a data structure specifying a current status of virus protection software installed on each other computing device in the plurality of computing devices associated with the social group; and
 generate a separate notification message for each of the one or more second computing devices, wherein a content of the separate notification message is customized to a current status of virus protection software of a computing device associated with an address to which the separate notification message is sent.

11. The computer program product of claim 10, wherein the computer readable program causes the computing device to identify the social group associated with the first computing device by:
 retrieving, from a communication application on the first computing device, a listing of addresses that are included in the social group.

12. The computer program product of claim 11, wherein the listing of addresses comprises at least one of electronic mail addresses from a contacts directory of an electronic mail client application on the first computing device or instant messaging addresses from an instant messaging application on the first computing device.

13. The computer program product of claim 10, wherein the data structure is updated based on update/patch notifications received from the other computing devices in the plurality of computing devices identifying an update/patch to the other computing devices' virus protection software.

14. The computer program product of claim 10, wherein the computer readable program causes the computing device to distribute a plurality of notification messages to one or more second computing devices of the plurality of computing devices associated with the social group by:
 determining, based on the data structure, which computing devices in the plurality of computing devices do not have the update or patch for handling the computer virus; and
 sending a notification message to only those computing devices of the plurality of computing devices determined to not have the update or patch for handling the computer virus installed in their virus protection software.

15. The computer program product of claim 14, wherein the computer readable program further causes the computing device to:
 send a message to computing devices of the plurality of computing devices determined to already have the update or patch for handling the computer virus installed in their virus protection software, the message indicating potential exposure to the computer virus and indicating that the update or patch has already been installed on an associated computing device.

16. The computer program product of claim 10, wherein the computer readable program further causes the computing device to:
 obtain, in at least one of the one or more second computing devices, the update or patch for handling the computer virus;

install the update or patch in virus protection software of the at least one of the one or more second computing devices; and run the virus protection software of the at least one of the one or more second computing devices.

17. The computer program product of claim 16, wherein the update or patch for handling the computer virus is received, from the first computing device, in the at least one of the one or more second computing devices in association with the notification message.

18. The computer program product of claim 16, wherein the notification message includes an indication of a timeframe in which the computer virus was spread to other computing devices in the plurality of computing devices, and wherein the computer readable program causes the computing device to run the virus protection software by running the virus protection software on communications or data received by the at least one of the one or more second computing devices in the indicated timeframe.

19. A data processing system, comprising:

at least one processor; and a memory coupled to the at least one processor, wherein the memory comprises instructions which, when executed by the at least one processor, cause the processor to:

detect an infection of a first computing device by a computer virus;

determine an update or patch to a virus protection software for handling the computer virus;

identify a social group associated with the first computing device, the social group being a defined group of addresses associated with a plurality of computing devices that communicate with each other;

distribute a plurality of notification messages to one or more second computing devices of the plurality of computing devices associated with the social group, wherein the notification messages identify the computer virus and the determined update or patch to the virus protection software associated with the computer virus;

maintain, in the first computing device, a data structure specifying a current status of virus protection software installed on each other computing device in the plurality of computing devices associated with the social group; and generate a separate notification message for each of the one or more second computing devices, wherein a content of the separate notification message is customized to a current status of virus protection software of a computing device associated with an address to which the separate notification message is sent.

* * * * *